W. H. MOORE, Jr.
BUMPER.
APPLICATION FILED OCT. 25, 1919.

1,341,572.  
Patented May 25, 1920.  
2 SHEETS—SHEET 1.

Witnesses  
Geo. Ackman Jr.

Inventor  
Wm. H. Moore, Jr  
By Victor J. Evans  
Attorney

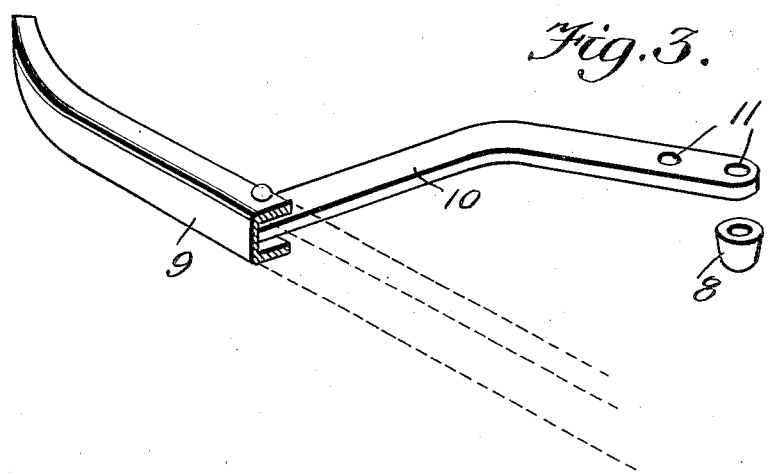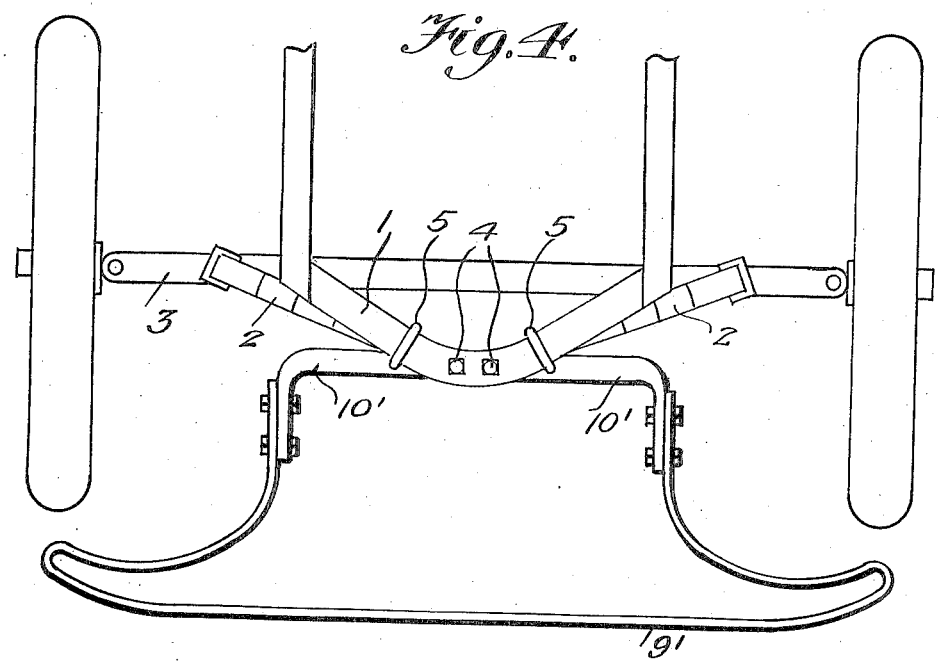

UNITED STATES PATENT OFFICE.

WILLIAM H. MOORE, JR., OF LITTLE ROCK, ARKANSAS.

BUMPER.

1,341,572.    Specification of Letters Patent.    Patented May 25, 1920.

Application filed October 25, 1919. Serial No. 333,238.

*To all whom it may concern:*

Be it known that I, WILLIAM H. MOORE, Jr., a citizen of the United States, residing at Little Rock, in the county of Pulaski and State of Arkansas, have invented new and useful Improvements in Bumpers, of which the following is a specification.

This invention relates to bumpers for automobiles and the principal object of the invention is to provide means for attaching the bumper to the automobile by fastening means already on the car so that no additional parts, other than the parts of the bumper, are used.

Another object of the invention is to provide the bumper with a pair of angle-shaped arms for connecting the same to the front spring attaching means of the automobile.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a view of the bumper and its spacer washer.

Fig. 4 is a diagrammatic plan showing its spring bumper.

Figure 1:
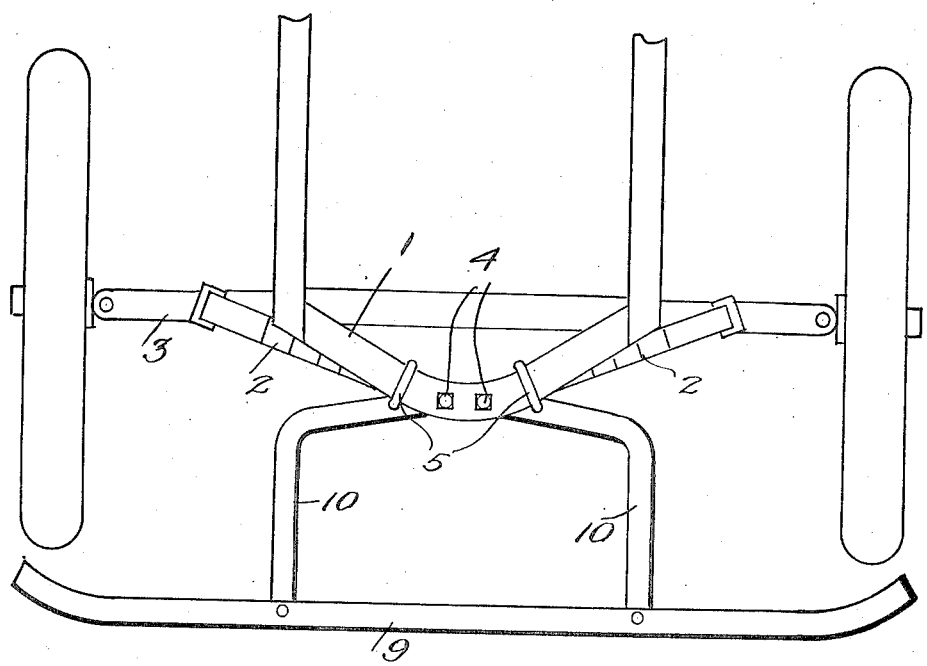
Figure 1 is a diagrammatic plan view showing my bumper applied to an automobile.
Figure 2:
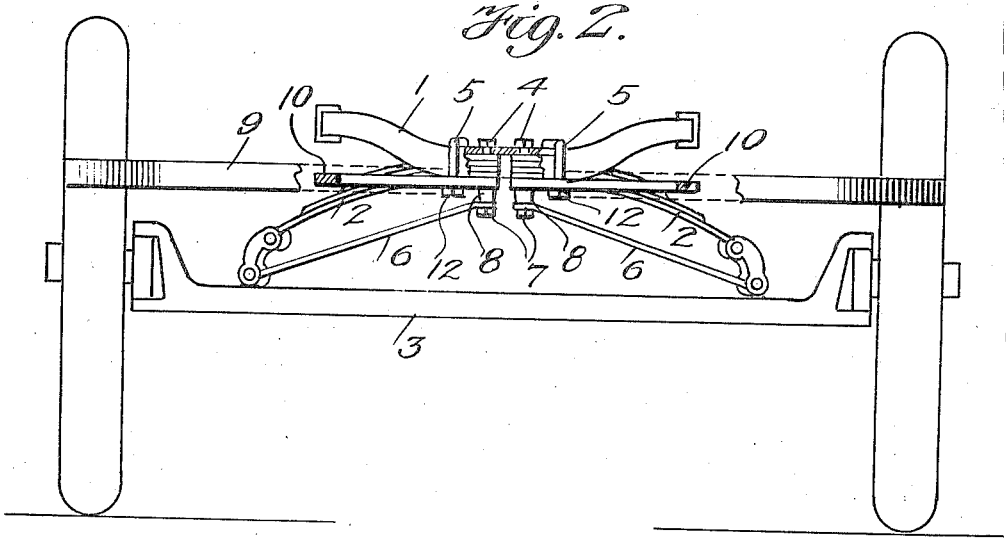
Fig. 2 is a front view with parts broken away.

In these views 1 indicates the front cross piece of the frame of the automobile to which the upper ends of the springs 2 are connected, the lower end of these springs being connected with the front axle 3. In the type of car for which my bumper is designed, the front springs are formed in two sections with their upper and inner ends spaced apart and connected with the cross piece 1 of the frame. Each section is connected with the cross piece by a bolt 4 and the clip 5. Each section is also provided with a separate spring 6 which has its lower end connected with the axle and its upper end held by the nut 7 and spacer 8 on the bolt 4.

My bumper consists of the usual channel bar 9 and the arms 10 for connecting the bars to the car. These arms are of substantially angle form with one of their ends connected to the bumper rod in the usual manner and their other ends having a pair of spaced openings 11 therein. One of these openings in each arm is adapted to engage the bolt 4 and the other opening is adapted to engage one arm of the clip 5, the arms being located on the underside of the spring sections and between the main part of the sections and the spring 6. In order to render it unnecessary to use a longer bolt 4 I substitute a shorter spacer 8 than the spacer which comes with the car so that the combined thickness of this substituted spacer and the arm would be equal to that of the original spacer.

In applying the bumper the nuts 12 and spacers are removed from the bolts 4 and the nuts on the outer limbs of the clips 5 are also removed. The arms of the bumper are then put in place with the ends of these bolts passing through the spaced openings 11 in said arms, the short spacer being placed on each of the bolts 4 to space the arm from the bottom of the spring. The springs 9 are then placed on the bolts 4 and the nuts replaced on said bolts and clips. Thus the bumper will be secured to the car without using additional bolts and fastening means.

If it is desired to use a spring type of bumper such as shown at 9′ in Fig. 4 the arms 10′ are of substantially L-shape, as one limb of each arm is shorter than the other and the opening in this short limb passes horizontally through the arm, instead of vertically as in the first form so as to receive the bent arms of the spring member 9′ as clearly shown in Fig. 4. In other respects this construction is the same as shown in the first form.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A bumper of the class described comprising a pair of arms, each provided with a rightangular extending portion, one part of said arm having a pair of spaced openings therein for engaging the spring bolts and the spring clips.

2. In combination with an automobile having its front spring formed of two sections, a bolt and clip connecting the upper end of each section with the frame, a bumper comprising a pair of arms, each arm having a pair of spaced openings therein for receiving the lower ends of said bolts and clips.

3. In combination with an automobile having its front spring formed of two sections, a bolt and clip connecting the upper end of each section with the frame, a bumper comprising a pair of arms, each arm having a pair of spaced openings therein for receiving the lower ends of said bolts and clips and a short spacer engaging each bolt and located between the bottom of the spring and the arm.

In testimony whereof I affix my signature.

WILLIAM H. MOORE, Jr.